United States Patent
Nomura et al.

(10) Patent No.: US 8,117,936 B2
(45) Date of Patent: Feb. 21, 2012

(54) GEAR SUPPORT STRUCTURE

(75) Inventors: Hiroshi Nomura, Saitama (JP); Koji Hagihara, Tokyo (JP)

(73) Assignee: Hoya Corporation, Tokyo (JP)

( * ) Notice: Subject to any disclaimer, the term of this patent is extended or adjusted under 35 U.S.C. 154(b) by 660 days.

(21) Appl. No.: 12/265,150

(22) Filed: Nov. 5, 2008

(65) Prior Publication Data

US 2009/0120223 A1    May 14, 2009

(30) Foreign Application Priority Data

Nov. 9, 2007  (JP) .................................. 2007-291656
Jun. 27, 2008  (JP) .................................. 2008-169584

(51) Int. Cl.
*F16H 57/00*    (2006.01)
*G02B 15/14*    (2006.01)
*G03B 17/00*    (2006.01)

(52) U.S. Cl. .............. 74/411; 359/694; 74/406; 396/72; 396/75

(58) Field of Classification Search ............ 74/406, 74/409, 411, 421 R; 359/694, 696, 698; 396/72, 75, 85

See application file for complete search history.

(56) References Cited

U.S. PATENT DOCUMENTS

| | | | | |
|---|---|---|---|---|
| 1,410,655 A | * | 3/1922 | Clifford | .......................... 74/411 |
| 1,538,234 A | * | 5/1925 | Beasley | .......................... 139/311 |
| 3,180,168 A | * | 4/1965 | Harris | .............................. 74/405 |
| 6,997,076 B2 | * | 2/2006 | Menjak et al. | .................. 74/409 |
| 7,016,123 B2 | * | 3/2006 | Yano | .............................. 359/697 |
| 2004/0042092 A1 | | 3/2004 | Nomura | |
| 2004/0105168 A1 | | 6/2004 | Hamasaki | |
| 2004/0156122 A1 | | 8/2004 | Nomura et al. | |
| 2005/0169621 A1 | | 8/2005 | Nomura | |
| 2005/0195499 A1 | * | 9/2005 | Makii et al. | .................. 359/696 |
| 2006/0291073 A1 | * | 12/2006 | Nomura | ........................ 359/694 |
| 2007/0092238 A1 | | 4/2007 | Shirakata | |

FOREIGN PATENT DOCUMENTS

JP    2007-114530    5/2007

* cited by examiner

*Primary Examiner* — Justin Krause
(74) *Attorney, Agent, or Firm* — Greenblum & Bernstein P.L.C.

(57) ABSTRACT

A gear support mechanism for supporting two gears and an intermediate gear which meshes with the two gears to transfer rotation of one of the two gears to the other, includes a gear-shaft support member(s) which supports a gear shaft of the intermediate gear; and a spring member installed between the gear-shaft support member and the intermediate gear. The spring member includes a gear contacting portion which is in contact with the intermediate gear, and resilient support legs extend radially from the gear contacting portion and are in contact with the gear-shaft support member, the spring member biasing the intermediate gear in a direction of an axis of the gear shaft. Each of the two gears is positioned in an inter-leg space between adjacent resilient support legs as viewed in a direction along the axis of the gear shaft.

14 Claims, 15 Drawing Sheets

GEAR SUPPORT STRUCTURE

BACKGROUND OF THE INVENTION

1. Field of the Invention

The present invention relates to a support structure for supporting gears of a gear train for power transmission.

2. Description of the Related Art

In drive mechanisms for moving an object to be driven by translating rotary motion of a rotary output shaft of a drive source such as a motor into axial (linear) motion, two types of drive mechanisms are known in the art: a drive mechanism which directly connects a lead screw (leadscrew) to the rotary output shaft, and a drive mechanism which transfers rotational torque from the rotary output shaft to another lead screw via a gear train. The former drive mechanism tends to be long in the axial direction of the rotary output shaft and thus unsuitable for an apparatus which needs to be slimmed down in the axial direction. In the latter type of drive mechanism that uses a gear train, the drive mechanism can be slimmed down in the axial direction because a drive source such as a motor and the lead screw can be arranged side by side. However, in the case of using a gear train, heed has to be given not only to the support stability of the driving gear on the rotary output shaft side and the support stability of the driven gear on the lead screw side but also the support stability of the intermediate gear positioned between the driving gear and the driven gear. For instance, in an AF (autofocus) mechanism for an imaging device such as a digital camera, gears of the gear train are susceptible to rattling and produce noise if the support for the intermediate gear has excessive play because the motor is driven intermittently at high speed. An example of this type of support structure for supporting the intermediate gear of a gear train is disclosed in Unexamined Japanese Patent Publication 2007-114530 (hereinafter referred to as Patent Document 1).

In Patent Document 1, a spring washer (disk spring) is inserted between an end of a spur gear which includes an intermediate gear of a gear train and a support member which supports the rotational shaft of this spur gear to stabilize the spur gear by the biasing force of the spring washer. In general, a variation in resiliency (variation of load) of this type of biasing member per unit of displacement magnitude becomes greater as the size (distance from the point of support to the force-applied point) of the biasing member becomes smaller, and therefore, it is desirable that the size of the biasing member be as large as possible in order to obtain a stable biasing force in the case where dimensional tolerances of individual parts are taken into account. Various outer shapes of the spring washer disclosed in Patent Document 1 such as a circular shape, an oval shape and a rectangular shape have been proposed. If the spring washer with this kind of shape is increased in size, the distances between the gear shafts of the intermediate gear and the associated gears in front and in the rear of the intermediate gear need to be increased to prevent these gears from interfering with the spring washer, which becomes a cause of increasing the size of the gear mechanism.

SUMMARY OF THE INVENTION

The present invention has been devised in view of the above described drawbacks and provides a gear support structure which is compact in size, excellent in space-utilization efficiency and capable of holding the intermediate gear with a high degree of precision.

According to an aspect of the present invention, a gear support mechanism is provided for supporting two gears and an intermediate gear which meshes with the two gears to transfer rotation of one of the two gears to the other, the gear support mechanism including at least one gear-shaft support member which supports a gear shaft of the intermediate gear; and a spring member installed between the gear-shaft support member and the intermediate gear. The spring member includes a gear contacting portion which is in contact with the intermediate gear, and a plurality of resilient support legs which are resiliently deformable, extend radially from the gear contacting portion and are in contact with the gear-shaft support member, the spring member biasing the intermediate gear in a direction of an axis of the gear shaft by resiliently deforming the plurality of resilient support legs. At least a part of each the two gears is positioned in an inter-leg space between adjacent resilient support legs of the plurality of resilient support legs as viewed in a direction along the axis of the gear shaft.

It is desirable for the plurality of resilient support legs to be substantially the same in length from the gear contacting portion and arranged at substantially equi-angular intervals.

It is desirable for the gear-shaft support member to include at least one anti-rotation portion which engages with the plurality of resilient support legs to prevent the spring member from rotating.

It is desirable for the gear-shaft support member to include a cylindrical recessed portion for housing the intermediate gear, and for the anti-rotation portion to include a recessed portion formed on an inner wall of the cylindrical recessed portion.

It is desirable for the gear-shaft support member to include a gear-shaft forming portion from which the gear shaft of the intermediate gear projects; and a retaining member which is fixed to the gear-shaft forming portion, supports an end of the gear shaft and prevents the intermediate gear from coming off the gear shaft. The spring member is installed between the intermediate gear and one of the gear-shaft forming portion and the retaining member.

It is desirable for the gear contacting portion of the spring member is shaped into a ring having an opening into which the gear shaft is inserted.

It is desirable for the gear-shaft support member to include two parallel plates which support both ends of the gear shaft, respectively.

It is desirable for the intermediate gear to include a double gear including a small-diameter gear and a large-diameter gear which mesh with the two gears, respectively.

It is desirable for the plurality of resilient support legs to extend from the gear contacting portion in radial directions obliquely away from the intermediate gear.

It is desirable for a free end of each of the plurality of resilient support legs to include a contacting end portion which lies in a plane substantially parallel to the gear contacting portion when the spring member is in a free state.

In an embodiment, a gear support mechanism is provided, for supporting a gear train including a driving gear, a driven gear and an intermediate gear positioned between the driving gear and a driven gear to transfer rotational torque from the driving gear to the driven gear via the intermediate gear, the gear support mechanism including two support members which hold the intermediate gear therebetween and support both ends of a gear shaft of the intermediate gear, respectively; and a spring member installed between one of the two support members and the intermediate gear. The spring member includes a gear contacting portion which is in contact with the intermediate gear, and at least two resilient support legs which extend radially outwards from the gear contacting portion, radially outer ends of the two resilient support legs lying in a plane different from a plane in which the gear contacting portion lies and being in contact with the one of the two support members. At least a part of the driving gear and at least a part of the driven gear are positioned inside of a circumscribing circle of the two resilient support legs about an axis of the gear shaft as viewed in a direction of the axis of the gear shaft.

The present invention can be applied to gear mechanisms of various apparatuses. For instance, the present invention is suitable especially for a gear mechanism for driving an AF leas of an imaging device.

The gear shaft can be integrally formed with the gear-shaft support member, and a shaft hole, which rotatably supports the gear shaft, can be formed in the intermediate gear.

The gear shaft can be integrally formed with the intermediate gear, and a shaft hole, which rotatably supports the gear shaft, can be formed in the gear-shaft support member.

According to the present invention, each gear and the spring member can be arranged in a space-saving manner because the resilient support legs of the spring member sit at positions that do not interfere with either the two gears (driving and driven gears) which mesh with the intermediate gear or the gear shafts of the two gears. Additionally, since the lengths of the resilient support legs of the spring member are not limited by the configuration of the two gears, and also since the size and the degree of biasing force of the spring member can be freely determined by freely selecting the lengths of the resilient support legs, the intermediate gear can be supported with stability at a high degree of precision by suppressing any variations in the biasing force due to dimensional errors in the manufactured spring members. Additionally, as compared with the method of reducing variations in biasing force between the manufactured spring members by severely controlling the accuracy of small-sized spring members produced, a reduction in the production cost of the spring member is achieved if the present invention is applied to the gear support mechanism.

The present disclosure relates to subject matter contained in Japanese Patent Applications No. 2007-291656 (filed on Nov. 9, 2007) and No. 2008-169584 (filed on Jun. 27, 2008) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
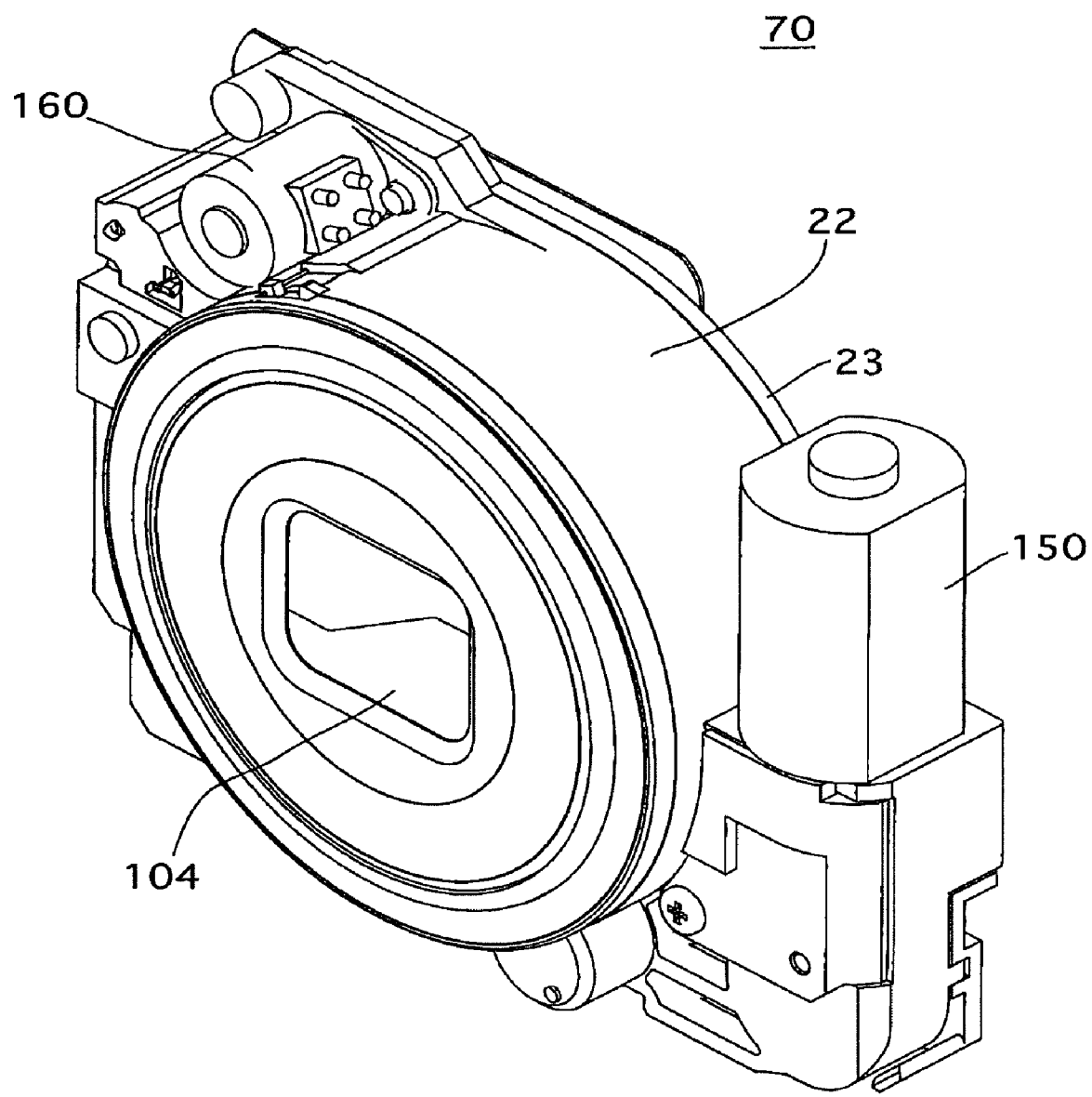
FIG. 1 is an external perspective view of a zoom lens barrel according to the present invention when the zoom lens barrel is in an accommodated state (fully retracted state)
Figure 2:
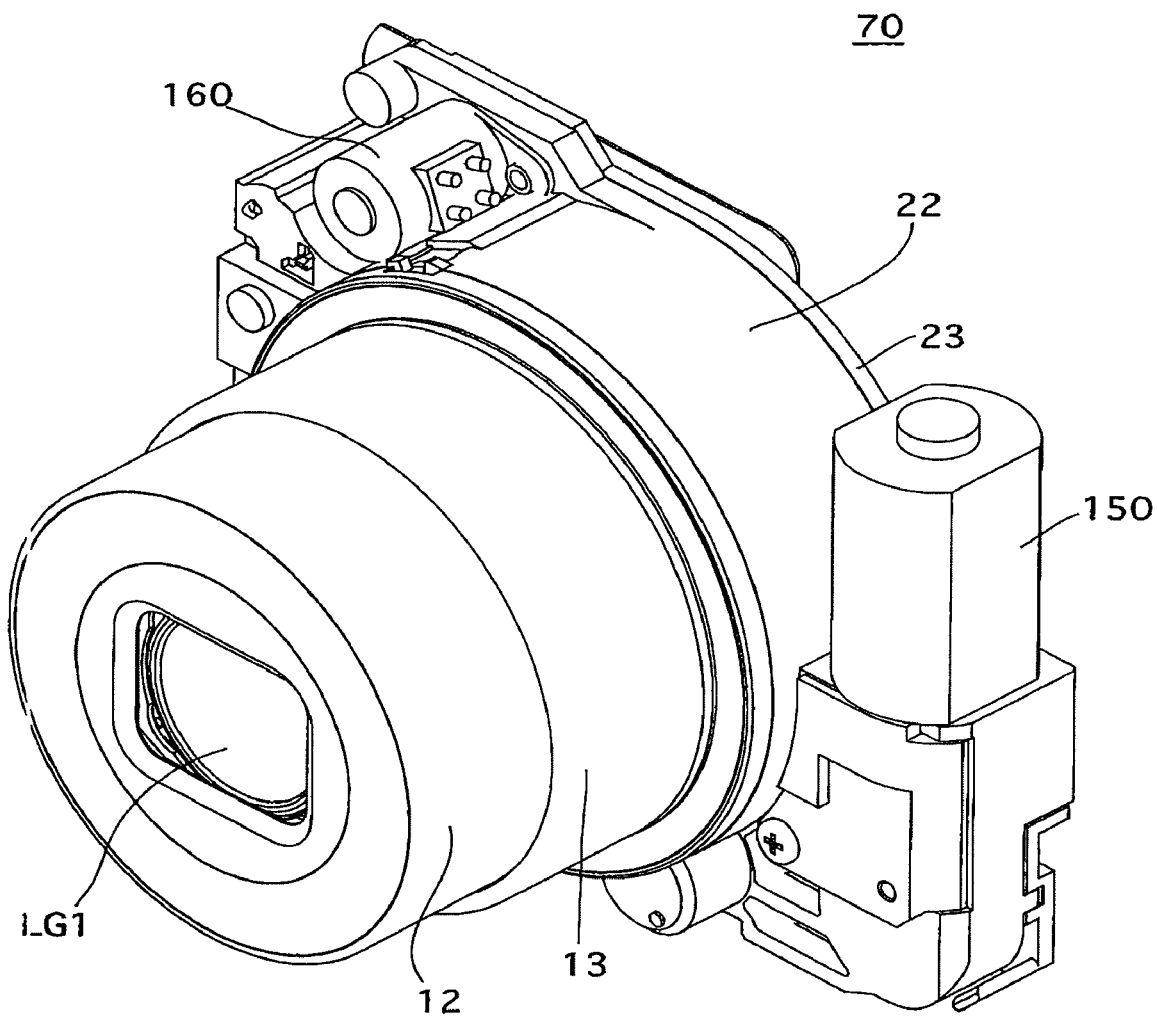
FIG. 2 is an external perspective view of the zoom lens barrel when the zoom lens barrel is in a ready-to-photograph state.
Figure 3:
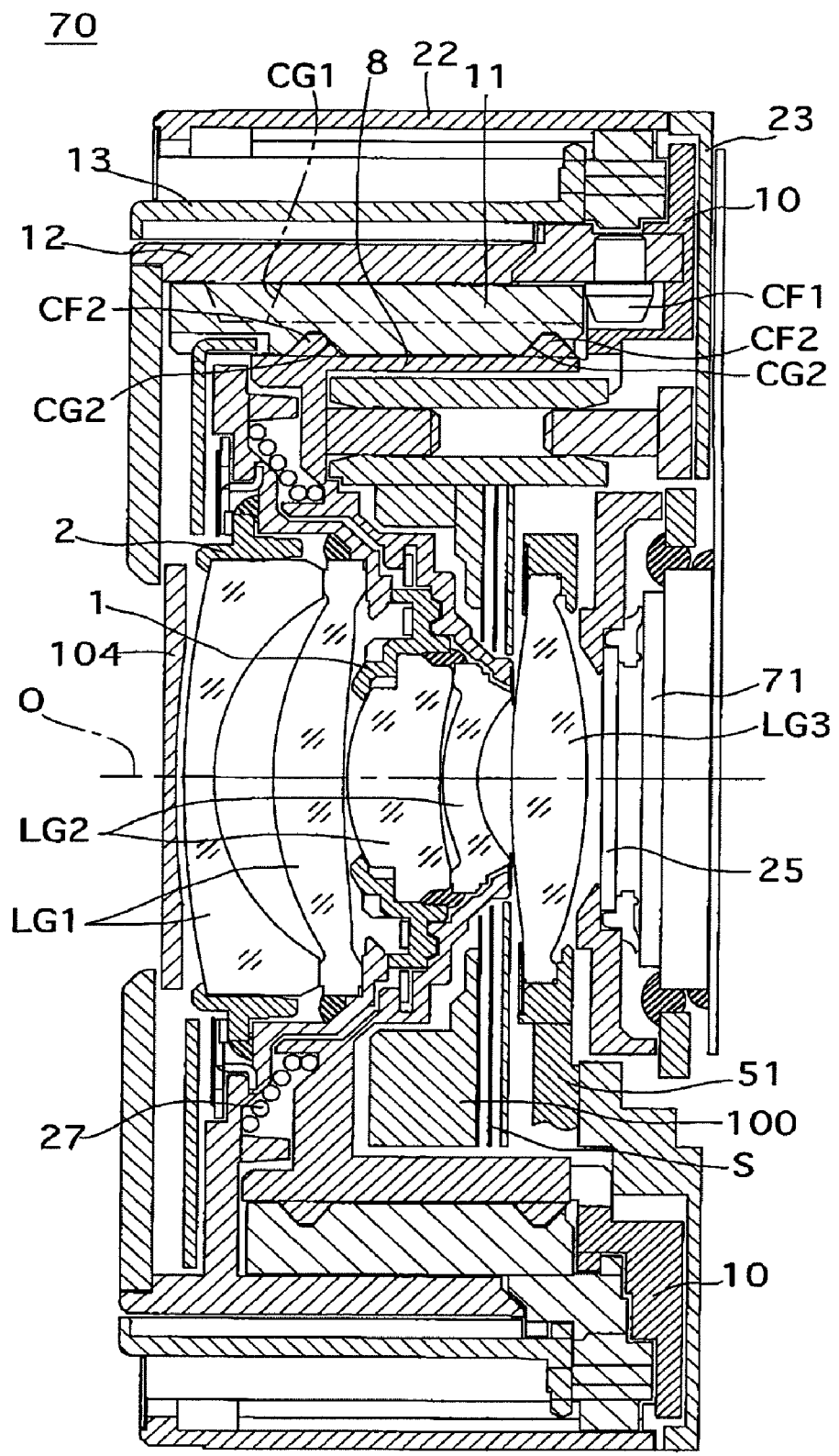
FIG. 3 is a cross sectional view of the zoom lens barrel when the zoom lens barrel is in the accommodated state.
Figure 4:
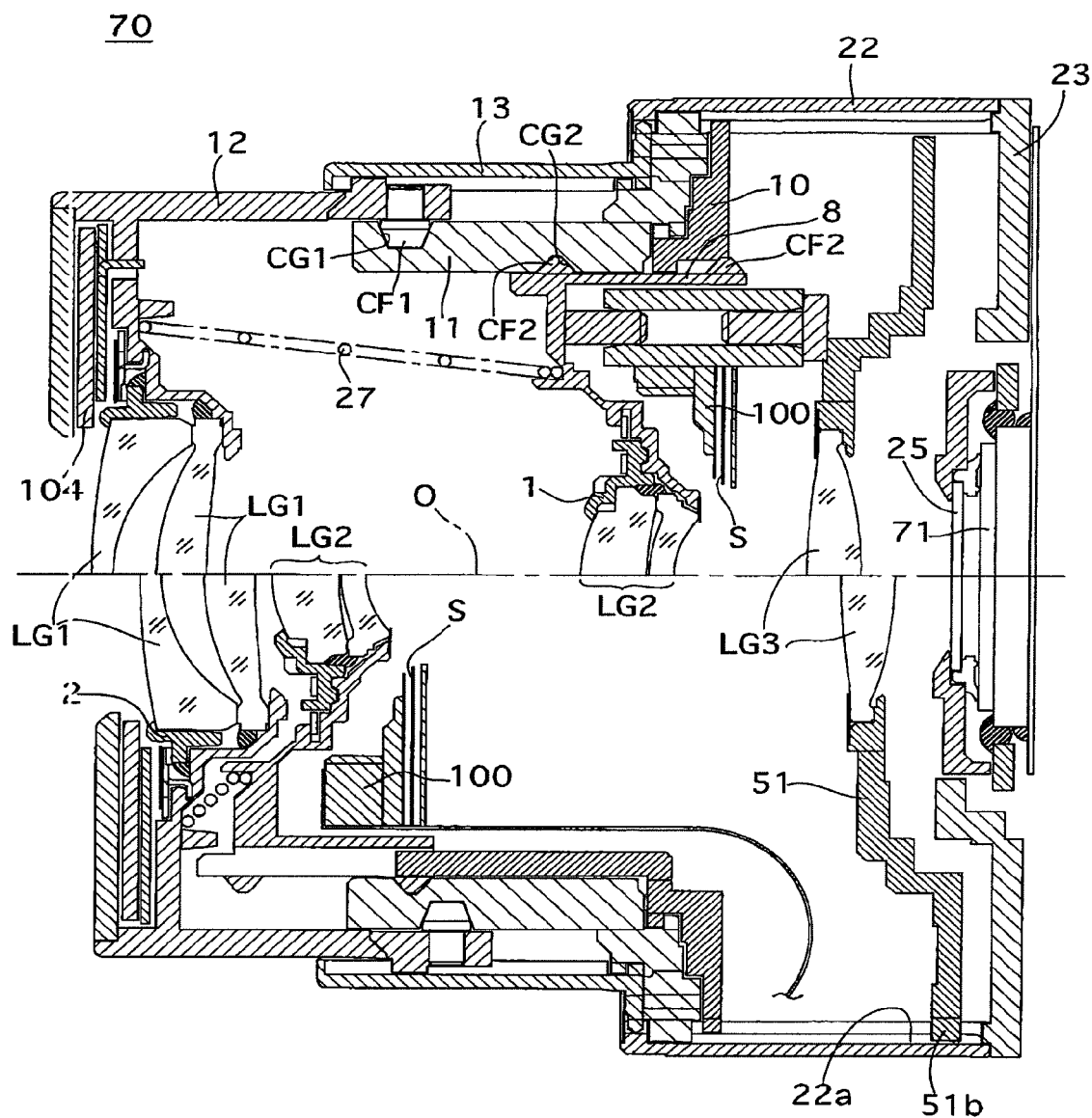
FIG. 4 is a cross sectional view of the zoom lens barrel when the zoom lens barrel is in a ready-to-photograph state, wherein an upper half and a lower half of the zoom lens barrel shown in FIG. 4 show the zoom lens barrel set at the wide-angle extremity and the telephoto extremity, respectively.

The brief description of the structure of a zoom lens barrel 70 including a gear support structure according to the present invention will be hereinafter discussed with reference to FIGS. 1 through 4. A photographing optical system of the zoom lens barrel 70 is provided with a first lens group LG1, a second lens group LG2, a set of shutter blades S that also serves as a set of diaphragm blades, a third lens group (AF lens group) LG3, a low-pass filter (optical filter) 25 and an image pickup device (image sensor) 71, in that order from the object side. In the following descriptions, the optical axis direction refers to a direction along or parallel to the photographing optical axis O of this photographing optical system.

The low-pass filter 25 and the image pickup device 71 are integrated as a single unit and this unit is fixed to an image pickup device holder 23, and the image pickup device holder 23 is fixed to the back of a housing 22 of the zoom lens barrel 70. A zoom motor 150 and an AF motor 160 are supported by the housing 22 on the outside thereof.

A third lens group frame 51 which supports the third lens group LG3 is supported by the housing 22 to be movable in the optical axis direction relative to the housing 22. The third lens group frame 51 is driven by the AF motor 160.

The cam ring 11 is positioned inside the housing 22 and supported by the housing 22. The cam ring 11 is rotated by the driving force of a zoom motor 150. The cam ring 11 moves in the optical axis direction while rotating about the photographing optical axis O until reaching a ready-to-photograph state (the wide-angle extremity shown in the upper half of FIG. 4) from the lens barrel accommodated state (shown in FIG. 3), and the cam ring 11 rotates at a fixed position in the optical axis direction when the zoom lens barrel 70 is in the zooming range (between the wide-angle extremity shown in an upper half of FIG. 4 and the telephoto extremity shown in a lower half of FIG. 4) in a ready-to-photograph state.

The zoom lens barrel 70 is provided with a first advancing barrel 13 and a linear guide ring 10 which are supported by the housing 22 with the cam ring 11 being positioned between the first advancing barrel 13 and the linear guide ring 10. Each of the first advancing barrel 13 and the linear guide ring 10 is guided linearly in the optical axis direction relative to the housing 22. In addition, each of the first advancing barrel 13 and the linear guide ring 10 is coupled to the cam ring 11 to be rotatable relative to the cam ring 11 and to move with the cam ring 11 in the optical axis direction.

The linear guide ring 10 guides a second lens group frame 8 linearly in the optical axis direction so that the second lens group moving frame 8 can move linearly in the optical axis direction relative to the linear guide ring 10. The zoom lens barrel 70 is provided inside the second lens group moving frame 8 with a second lens holding frame 2 and a shutter unit 100 which are supported by the second lens group moving frame 8. The second lens holding frame 2 holds the second lens group LG2 and the shutter unit 100 supports the shutter blades S. In addition, the first advancing barrel 13, which is guided linearly in the optical axis direction relative to the housing 22, further guides a second advancing barrel 12 linearly in the optical axis direction so that the second advancing barrel 12 can move linearly in the optical axis direction relative to the first advancing barrel 13. The zoom lens barrel 70 is provided inside the second advancing barrel 12 with a first lens group holding frame 1 which holds the first lens group LG1.

The second advancing barrel 12 is provided with first cam followers CF1 for moving the first lens group LG1, each of which projects radially inwards. Each first cam follower CF1 slidably engages in an associated first-lens-group control clan groove CG1 formed on an outer peripheral surface of the cam ring 11. Since the second advancing barrel 12 is guided linearly in the optical axis direction via the first advancing barrel 13, a rotation of the cam ring 11 causes the second advancing barrel 12 (i.e., the first lens group LG1) to move in the optical axis direction in a predetermined moving manner in accordance with the contours of the first-lens-group control cam grooves CG1.

The second lens group moving frame 8 is provided on an outer peripheral surface thereof with second cam followers CF2, each of which projects radially outwards, for moving the second lens group LG2. Each second cam follower CF2 slidably engages in an associated second-lens-group control cam groove CG2 formed on an inner peripheral surface of the cam ring 11. Since the second lens group moving frame 8 is guided linearly in the optical axis direction via the linear guide ring 10, a rotation of the cam ring 11 causes the second lens group moving frame 8 (i.e., the second lens group LG2) to move in the optical axis direction in a predetermined moving manner in accordance with the contours of the second-lens-group control cam grooves CG2.

The zoom lens barrel 70 is provided between the second lens group moving frame 8 and the second advancing barrel 12 with an inter-lens-group biasing spring 27 made of a compression spring which biases the second lens group moving frame 8 and the second advancing barrel 12 in opposite directions away from each other.

Operations of the zoom lens barrel 70 that has the above described structure will be discussed hereinafter. In the lens barrel accommodated state shown in FIGS. 1 and 3, the length of the optical system in the optical axis direction (the distance from the front surface (object-side surface) of the first lens group LG1 to the imaging surface of the image pickup device 71) is shorter than that in a ready-to-photograph state shown in FIGS. 2 and 4. In the lens barrel accommodated state, immediately after a state transitional signal for transition from the lens barrel accommodated state to a ready-to-photograph state (e.g., turning ON a main switch of the camera to which the zoom lens barrel 70 is mounted) is input to the zoom lens barrel 70, the zoom motor 150 is driven in the lens barrel advancing direction, which causes the cam ring 11 to advance in the optical axis direction while rotating. The linear guide ring 10 and the first advancing barrel 13 linearly move with the cam ring 11. Upon the cam ring 11 being rotated, the second lens group moving frame 8, which is guided linearly in the optical axis direction via the linear guide ring 10, is moved in the optical axis direction in a predetermined moving manner inside the cam ring 11 due to the engagement of the second cam followers CF2 with the second-lens-group control cam grooves CG2. Additionally, upon the cam ring 11 being rotated, the second advancing barrel 12, which is guided linearly in the optical axis direction via the first advancing barrel 13, is moved in the optical axis direction in a predetermined moving manner outside the cam ring 11 due to the engagement of the first cam followers CF1 with the first-lens-group control cam grooves CG1.

Namely, the amount of advancement of the first lens group LG1 from the lens barrel accommodated state is determined by the sum of the amount of forward movement of the cam ring 11 relative to the housing 22 and the amount of advancement of the second advancing barrel 12 relative to the cam ring 11, and the amount of advancement of the second lens group LG2 from the lens barrel accommodated state is determined by the sum of the amount of forward movement of the cam ring 11 relative to the housing 22 and the amount of advancement of the second lens group moving frame 8 relative to the cam ring 11. A zooming operation is carried out by moving the first lens group LG1 and the second lens group LG2 along the photographing optical axis O while changing the air distance therebetween. Driving the zoom motor 150 in a barrel-advancing direction so as to advance the zoom lens barrel 70 from the lens barrel accommodated state firstly causes the zoom lens barrel 70 to move to the wide-angle extremity shown in the upper half of the cross sectional view in FIG. 4, and further driving the zoom motor 150 in the same direction causes the zoom lens barrel 70 to move to the telephoto extremity shown in the lower half of the cross sectional view in FIG. 4. In the zooming range between the telephoto-extremity and the wide-angle extremity, the cam ring 11 rotates at a fixed position as described above, thus not moving either forward or rearward in the optical axis direction. Immediately after a transition signal for transition from a ready-to-photograph state to the lens barrel accommodated state (e.g., for turning OFF the aforementioned main switch of the camera to which the zoom lens barrel 70 is mounted) is input to the zoom lens barrel 70, the zoom motor 150 is driven in the lens barrel retracting direction, which causes the zoom lens barrel 70 to perform a lens barrel retracting operation reverse to the above described lens barrel advancing operation.

The zoom lens barrel 70 is provided at the front end of the second advancing barrel 12 with a set of protective barrier blades 104 which opens and shuts the front of the first lens group LG1. The set of protective barrier blades 104 is closed in the lens barrel accommodated state, and opened in accordance with the lens barrel advancing operation.

The third lens group frame 51 that supports the third lees group LG3 can be moved forward and rearward in the optical axis direction by the AF motor 160 independently of the above described driving operations of the first lens group LG1 and the second lens group LG2 that are performed by the zoom motor 150. In addition, when the photographing optical system of the zoom lens barrel 70 is in the zooming range from the wide-angle extremity to the telephoto extremity, the third lens group LG3 is moved in the optical axis direction to perform a focusing operation by driving the AF motor 160 in accordance with object distance information obtained by a distance measuring device (not shown) provided, e.g., in the camera to which the zoom lens barrel 70 is mounted.

Figure 5:
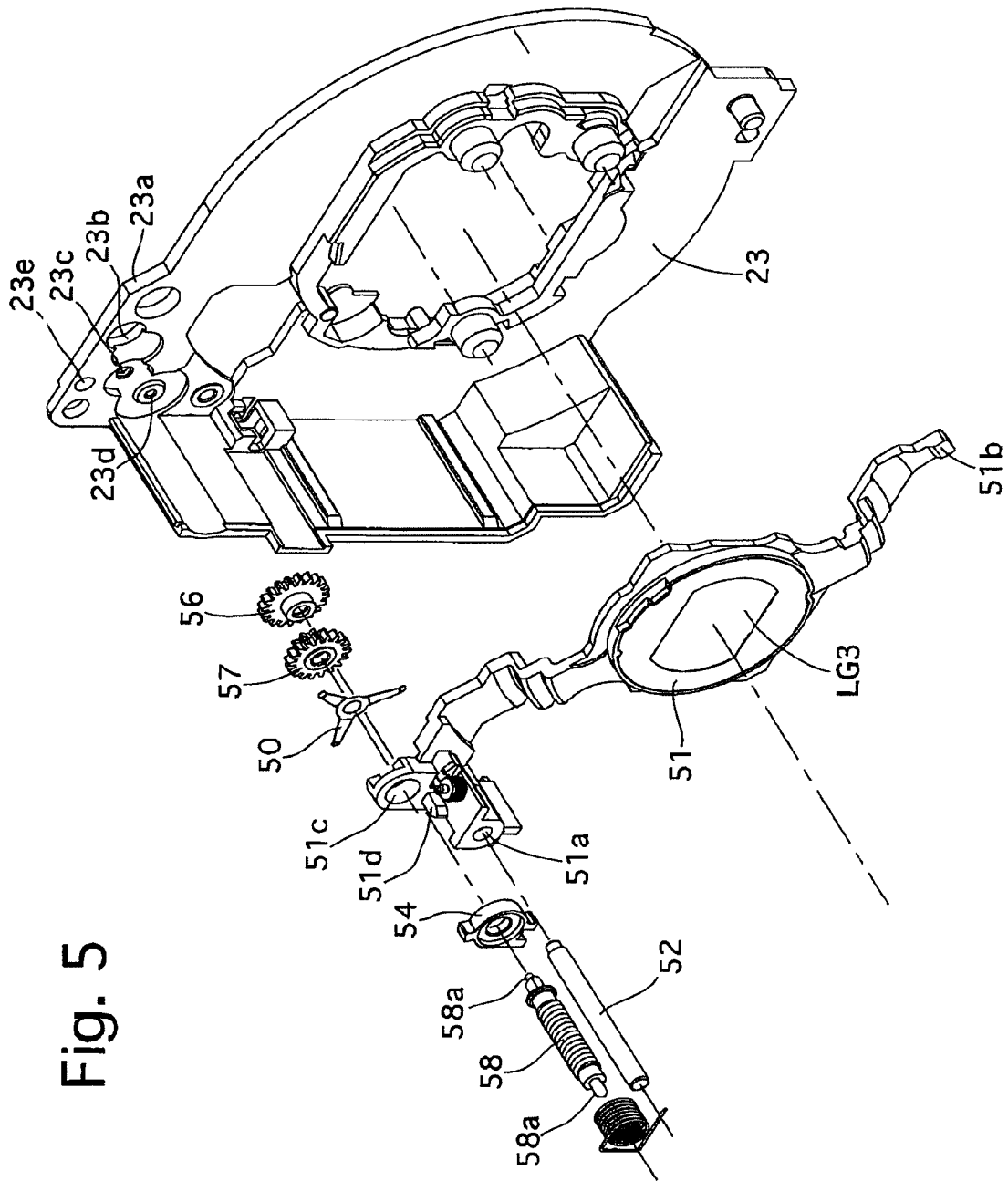
FIG. 5 is an exploded front perspective view of a drive mechanism for a third-lens-group frame.
Figure 6:
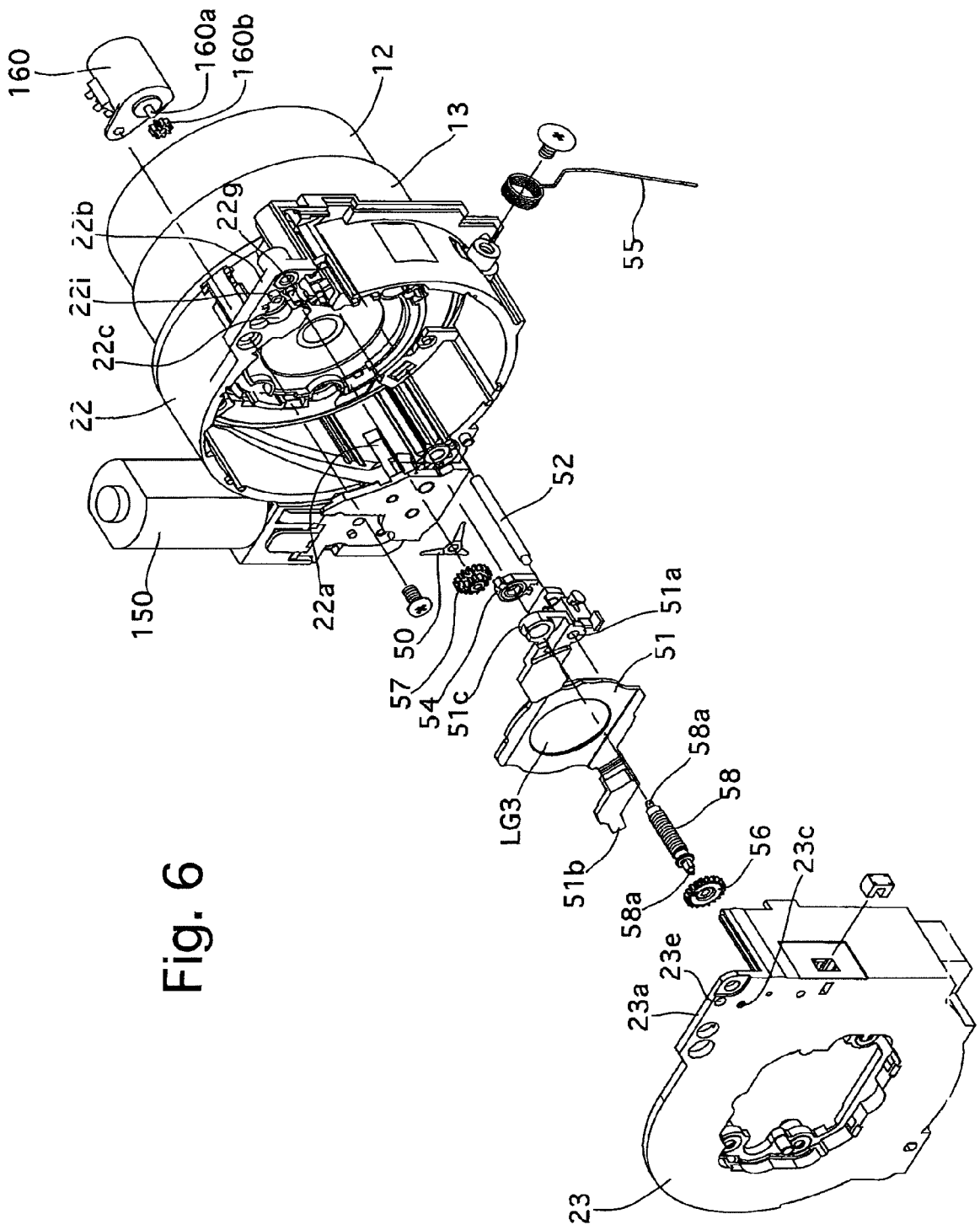
FIG. 6 is an exploded rear perspective view of the drive mechanism for the third-lens-group frame and associated elements of the zoom lens barrel.
Figure 7:
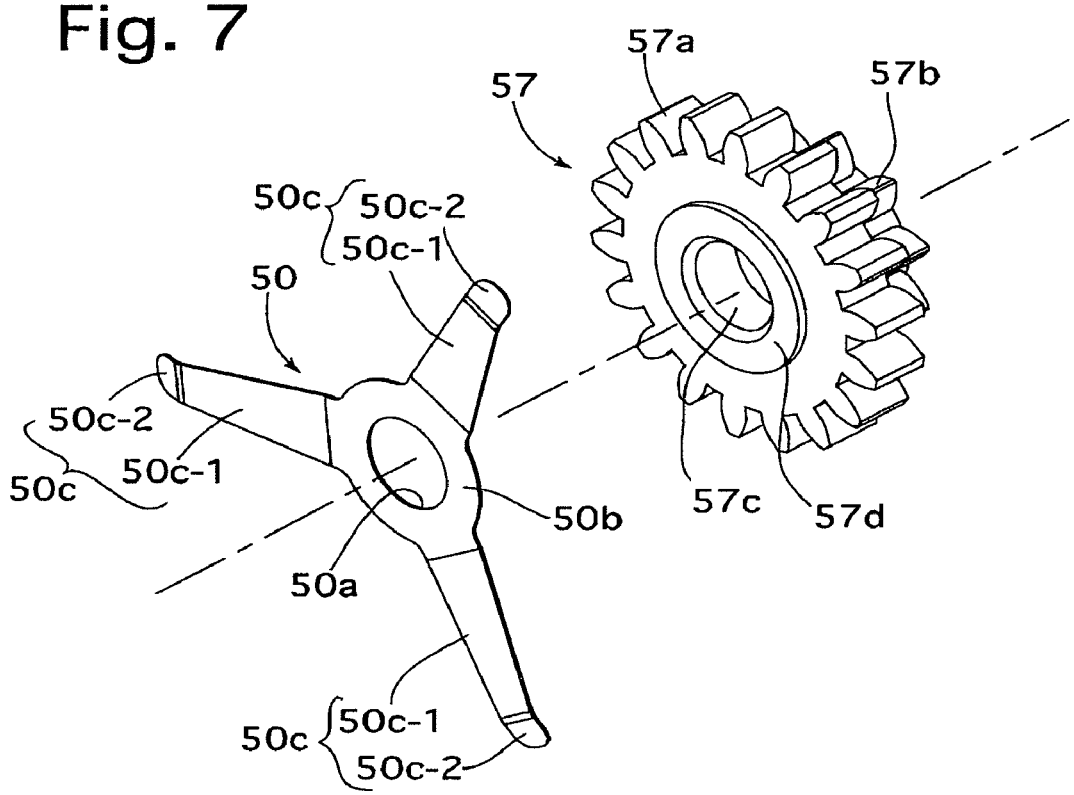
FIG. 7 is an exploded front perspective view of an intermediate gear and an intermediate-gear biasing spring that are elements of the drive mechanism for the third-lens-group frame.
Figure 8:
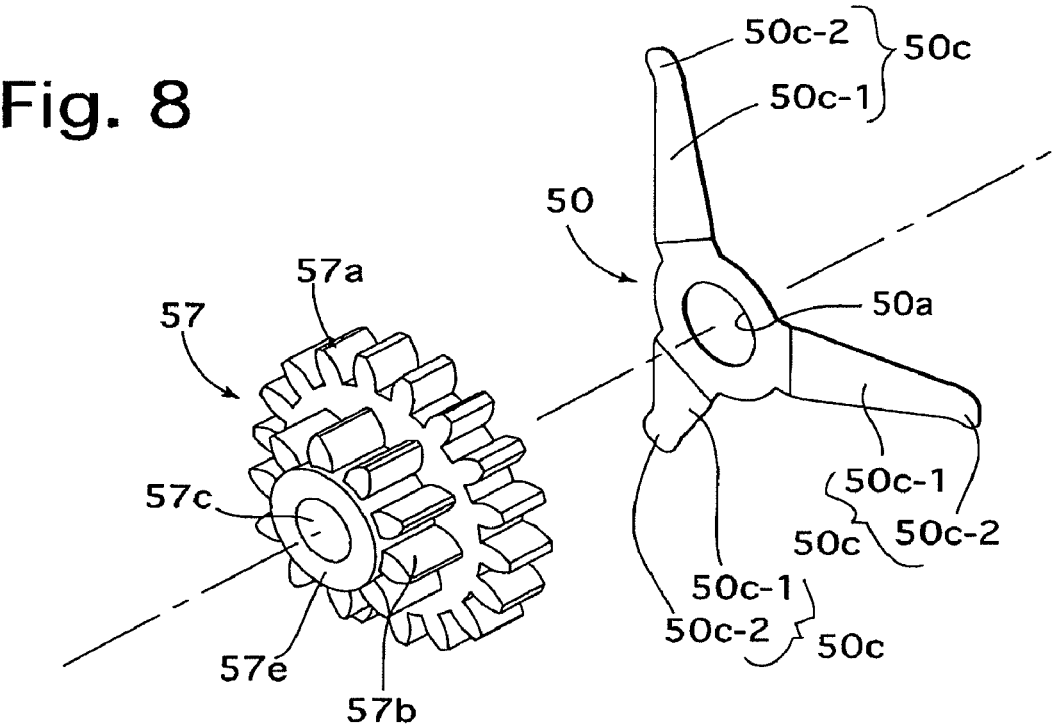
FIG. 8 is an exploded rear perspective view of the intermediate gear and the intermediate-gear biasing spring of the drive mechanism for the third-lens-group frame.
Figure 9:
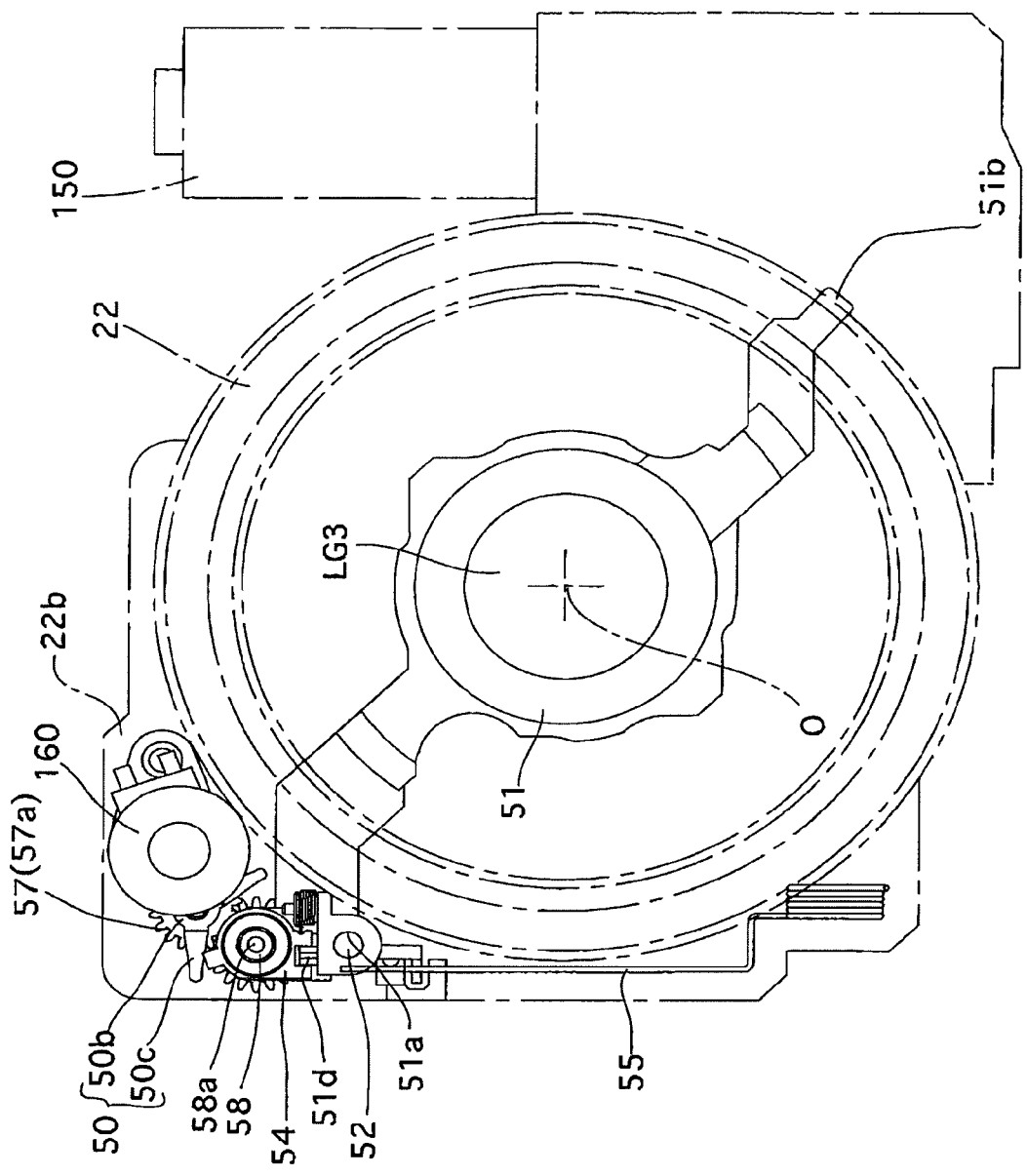
FIG. 9 is a front elevational view of the zoom lens barrel, mainly showing the third-lens-group frame and the drive mechanism therefor.

As shown in the drawings from FIG. 5 onwards, the zoom lens barrel 70 is provided between the housing 22 and the image pickup device 23 with a third lens group guide shaft 52 parallel to the photographing optical axis O, and the third lens group frame 51 is provided at one radial end thereof with a guide hole 51a into which the third lens group guide shaft 52 is slidably inserted to be supported by the third lens group frame 51. The third lens group frame 51 is provided, at a position substantially symmetrical to the position of the guide hole 51a with respect to the photographing optical axis O, with an anti-rotation key 51b which is engaged in an anti-rotation groove 22a formed on the housing 22 to prevent the third lens group frame 51 from rotating so that the third lens group frame 51 is guided to be capable of moving only linearly in the optical axis direction along the third lens group guide shaft 52. The third lens group frame 51 is biased forward in the optical axis direction (toward the object side) by a torsion spring 55 which is supported by a side portion of the housing 22. Due to the biasing force of the torsion spring 55, a nut abutting portion 53.c formed on the third lens group frame 51 abuts against an AF nut 54 installed in front of the nut abutting portion 51c.

Figure 10:
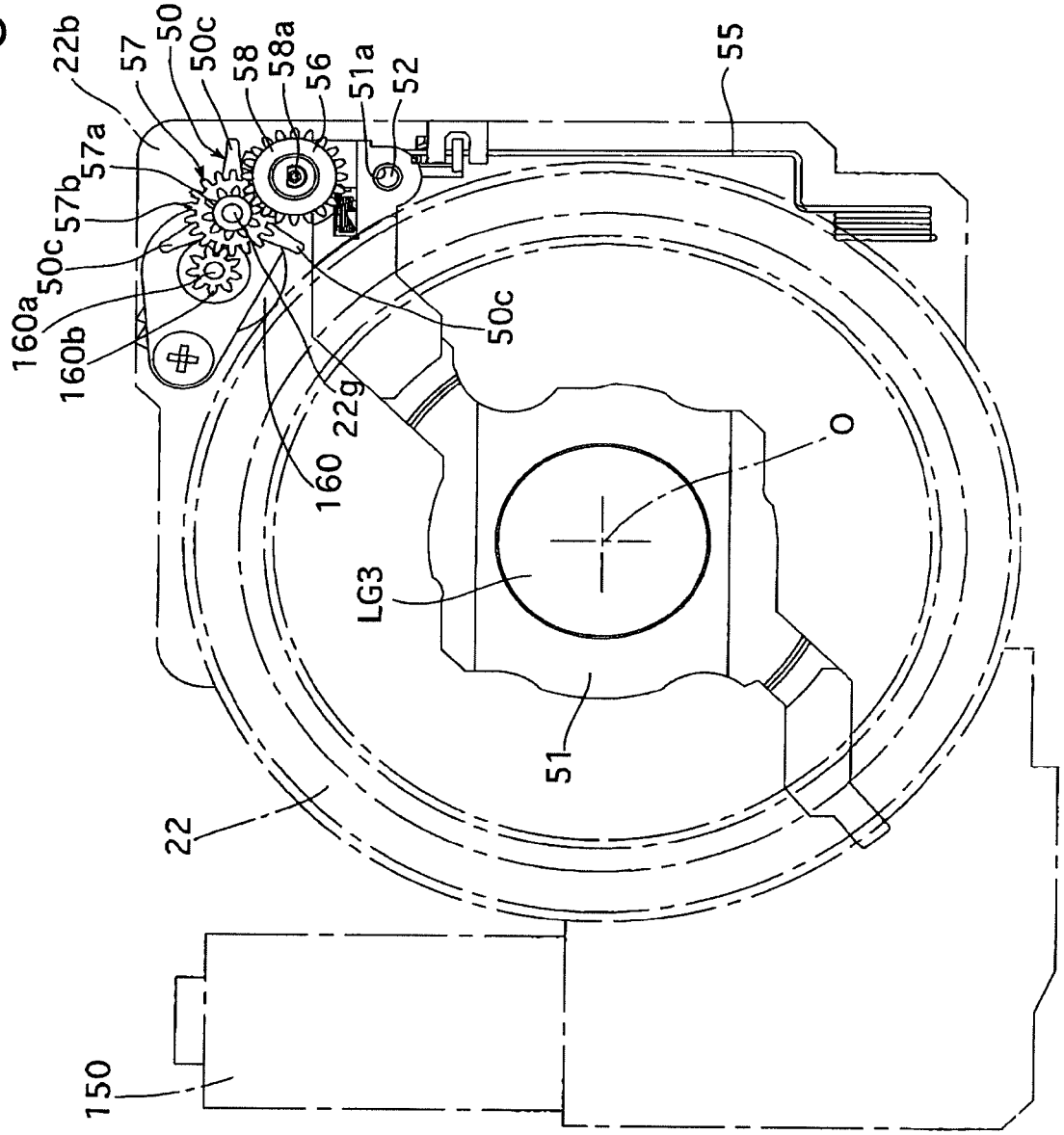
FIG. 10 is a rear elevational view of the zoom lens barrel, mainly showing the third-lens-group frame and the drive mechanism therefor.
Figure 11:
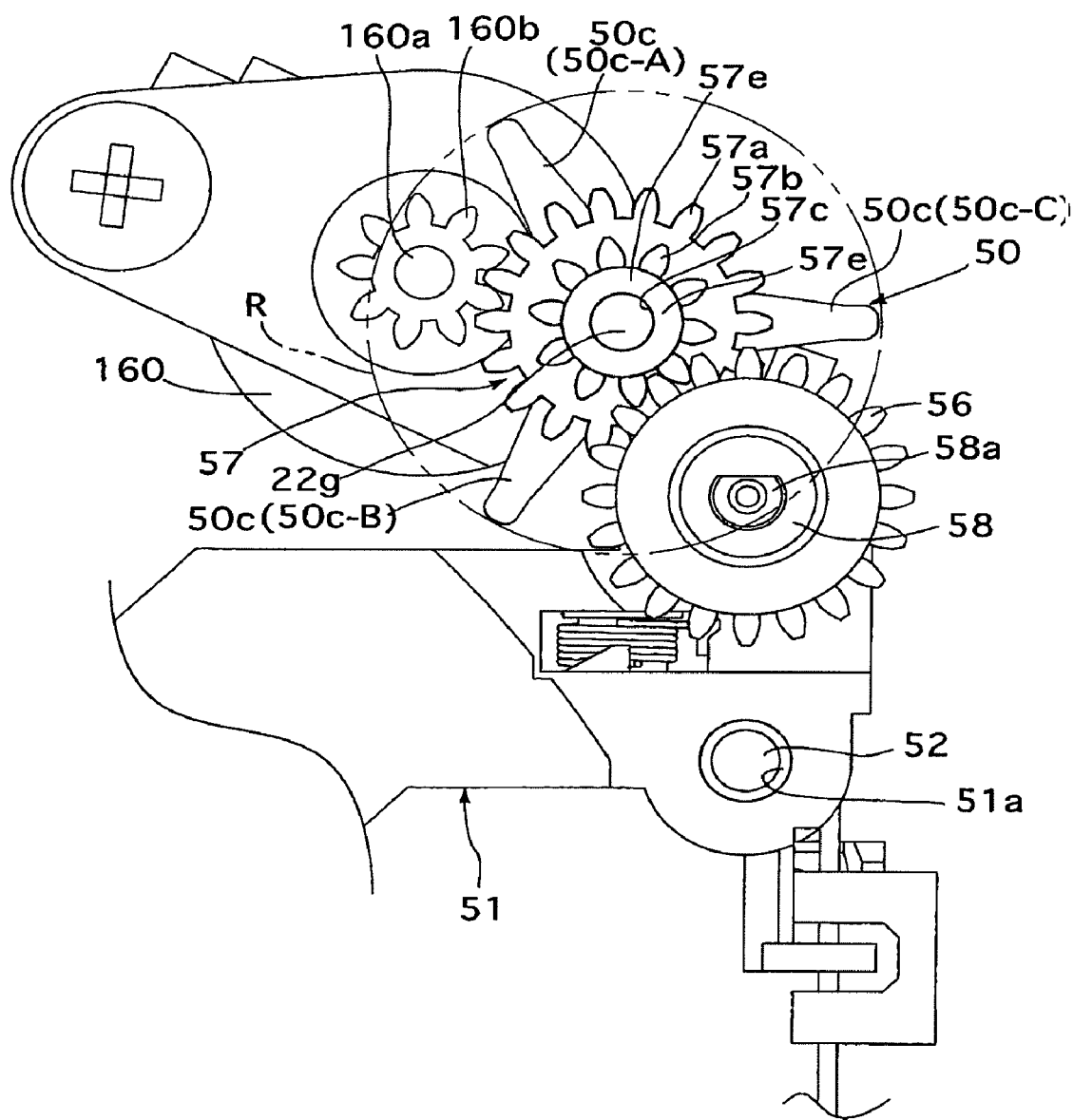
FIG. 11 is an enlarged view of a portion of the zoom lens barrel shown in FIG. 10 in the vicinity of the drive mechanism for the third-lens-group frame.

The AF nut 54 is moved in the optical axis direction by a drive mechanism with the AF motor 160 as a drive source. The housing 22 is provided on top thereof with a drive mechanism installation portion (gear-shaft support member/gear-shaft forming portion) 22b. The AF motor 160 is fixed to the front side of the drive mechanism installation portion 22b. A pinion (driving gear) 160b fixed on a rotary output shaft 160a of the AF motor 160 projects rearward from the drive mechanism installation portion 22b. An intermediate gear 57 and a driven gear 56 which engage with the pinion 160b and the intermediate gear 57, respectively, are fitted on shafts formed on the rear side of the drive mechanism installation portion 22b to be rotatably supported thereby. Rotation of the rotary output shaft 160a of the AF motor 160 is transferred via the pinion 160b and the intermediate gear 57 to a screw shaft 58 which coaxially rotates with the driven gear 56. The screw shaft 58 is supported between the housing 22 and the image pickup device holder 23 to be freely rotatable on a rotation shaft 58a, and the driven gear 56 and the screw shaft 58 are made to be integral with each other by the engagement of a shaft portion having a non-circular cross section which is formed oil the rotation shaft 58a with a central hole having a corresponding non-circular cross section which is formed through the drive gear 56 as shown in FIGS. 10 and 11. A helicoidal lead screw is formed on an outer peripheral surface of the screw shaft 58, and this lead screw portion of the screw shaft projects forward from the nut abutting portion 51c of the third lens group frame 51 through a through hole which is formed in the nut abutting portion 51c to be screw-engaged in the screw hole of the AF nut 54. The AF nut 54 is guided linearly in the optical axis direction (while being prevented from rotating), and linearly moves in the axial direction of the screw shaft 58 when the screw shaft 58 rotates.

The third lens group frame 51 is prevented from moving forward by the abutment of the nut abutting portion 51c against the AF nut 54 due to the biasing force of the torsion spring 55, and the position of the third lens group frame 51 in the optical axis direction is determined according to the AF nut 54. For instance, if the AF nut 54 is moved forward in the optical axis direction by the aforementioned drive mechanism for rotating the screw shaft 58 by the AF motor 160, the third lens group frame 51 follows the forward movement of the AF nut 54 by the biasing force of the torsion spring 55 to move forward by the amount of the forward movement of the AF nut 54. Conversely, if the AF nut 54 is moved rearward in the optical axis direction, the AF nut 54 presses the nut abutting portion 51c rearward, so that the third lens group frame 51 is moved rearward against the biasing force of the torsion spring 55. Namely, the position of the third lens group frame 51, which holds the third lens group LG3, in the optical axis direction varies by movement of the AF nut 54.

Figure 12:
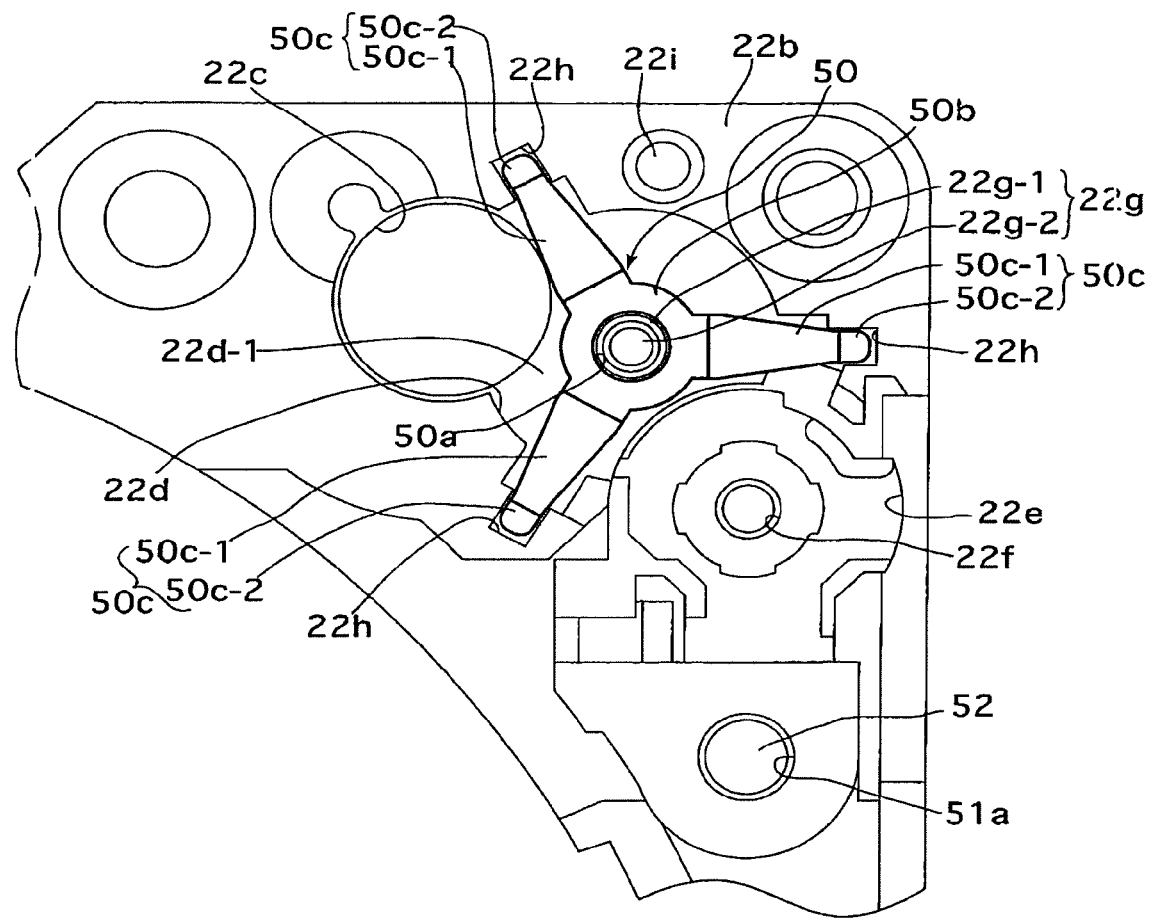
FIG. 12 is an enlarged view of a portion of the zoom lens barrel in a state where only the intermediate-gear biasing spring is installed onto a drive mechanism mounting portion of the housing of the zoom lens barrel.

As shown in FIG. 12, the housing 22 is provided on the rear side of the drive mechanism installation portion 22b with a pinion housing hole 22c, an intermediate-gear housing recess (cylindrical recessed portion) 22d and a screw-shaft housing space 22e. The pinion 160b is housed in the pinion housing hole 22c, the intermediate gear 57 is housed in the intermediate-gear holding recess 22d, and the driven gear 56 and the screw shaft 58 are housed in the screw-shaft holding solace 22e. The housing 22 is provided at the front end of the screw-shaft housing space 22e with a bearing hole 22f which rotatably supports the front end of the rotation shaft 58a of the screw shaft 58. The pinion housing hole 22c is formed as a through hole in the optical axis direction to allow the rotary output shaft 160a of the AF motor 160 to be inserted into the pinion housing hole 22c, whereas the intermediate-gear housing recess 22d is formed as a cylindrical recess having a bottom surface 22d-1. The housing 22 is provided at a substantially center of the bottom surface 22d-1 with a gear-shaft projection 22g which projects rearward in the optical axis direction to rotatably support the intermediate gear 57. As shown in FIGS. 7, 8, 13 and 14, the intermediate gear 57 is formed as a double spur gear having a large-diameter gear portion 57a and a small-diameter gear portion 57b which are concentrically arranged and respectively engaged with the pinion 160b and the driven gear 56. A shaft hole 57c is formed through the center of the intermediate gear 57 to extend in the axial direction thereof. The gear-shaft projection 22g is provided with a large-diameter intermediate portion 22g-1, a small-diameter end portion 22g-2 and a disk-shaped base portion 22g-3. The diameter of the large-diameter intermediate portion 22g-1 corresponds to the diameter (inner diameter) of the shaft hole 57c, the small-diameter end portion 22g-2 is smaller in diameter than the large-diameter intermediate portion 22g-1, and the disk-shaped base portion 22g-3 is positioned on the bottom surface 22d-1 of the intermediate-gear housing recess 22d and is larger in diameter than the large-diameter intermediate portion 22g-1. Two axially-orthogonal end surfaces 57d and 57e of the intermediate gear 57 which are orthogonal to the axis of the gear-shaft projection 22g in a state where the intermediate gear 57 is rotatably supported bag the gear-shaft projection 22g thereon are formed on the large-diameter gear portion 57a and the small-diameter gear portion 57b, respectively.

The image pickup device holder 23 is provided with a gear-train retaining portion (gear-shaft support member/retaining member) 23a which faces the drive mechanism installation portion 22b. As shown in FIG. 5, the gear-train retaining portion 23a is provided with a shaft hole 23b, a shaft fixing hole 23c and a shaft hole 23d. The shaft hole 23b rotatably supports the outer end (rear end) of the rotary output shaft 160a of the AF motor 160, the small-diameter end portion 22g-2 of the gear-shaft projection 22g is engaged in the shaft fixing hole 23c, and the shaft hole 23d rotatably supports the rear end of the rotation shaft 58a of the screw shaft 58.

Accordingly, in a state where the image pickup device holder 23 is fixed to the back of the housing 22, the pinion 160b, the intermediate gear 57, the driven gear 56 and the screw shaft 58 are each held between the drive mechanism installation portion 22b and the gear-train retaining portion 23a to be rotatable therebetween. The axis of the rotary output shaft 160a of the AF motor 160, which serves as the center of rotation of the pinion 160b, the axis of the gear-shaft projection 22g, which serves as the center of rotation of the intermediate gear 57, and the axis of the rotation shaft 58a, which serves as the center of rotation of both the driven gear 56 and the screw shaft 58, are substantially parallel to the photographing optical axis O.

The intermediate gear 57, which serves as an element of a gear train, is stably held between the drive mechanism installation portion 22b and the gear-train retaining portion 23a by being biased by an intermediate-gear biasing spring (spring member) 50 in the axial direction of the gear-shaft projection 22g. The intermediate-gear biasing spring 50 is made of a thin metal plate and provided with an annular central seating portion (gear contacting portion) 50b and three resilient support legs 50c (50c-A, 50c-B and 50c-C). A circular hole (opening) 50a into which the large-diameter intermediate portion 22g-1 of the gear-shaft projection 22g is inserted is formed through the central seating portion 50b, and the three resilient support legs 50c extend in different radial directions from the central seating portion 50b to shape the intermediate-gear biasing spring 50 like a three-pointed star in plan view.

Figure 13:
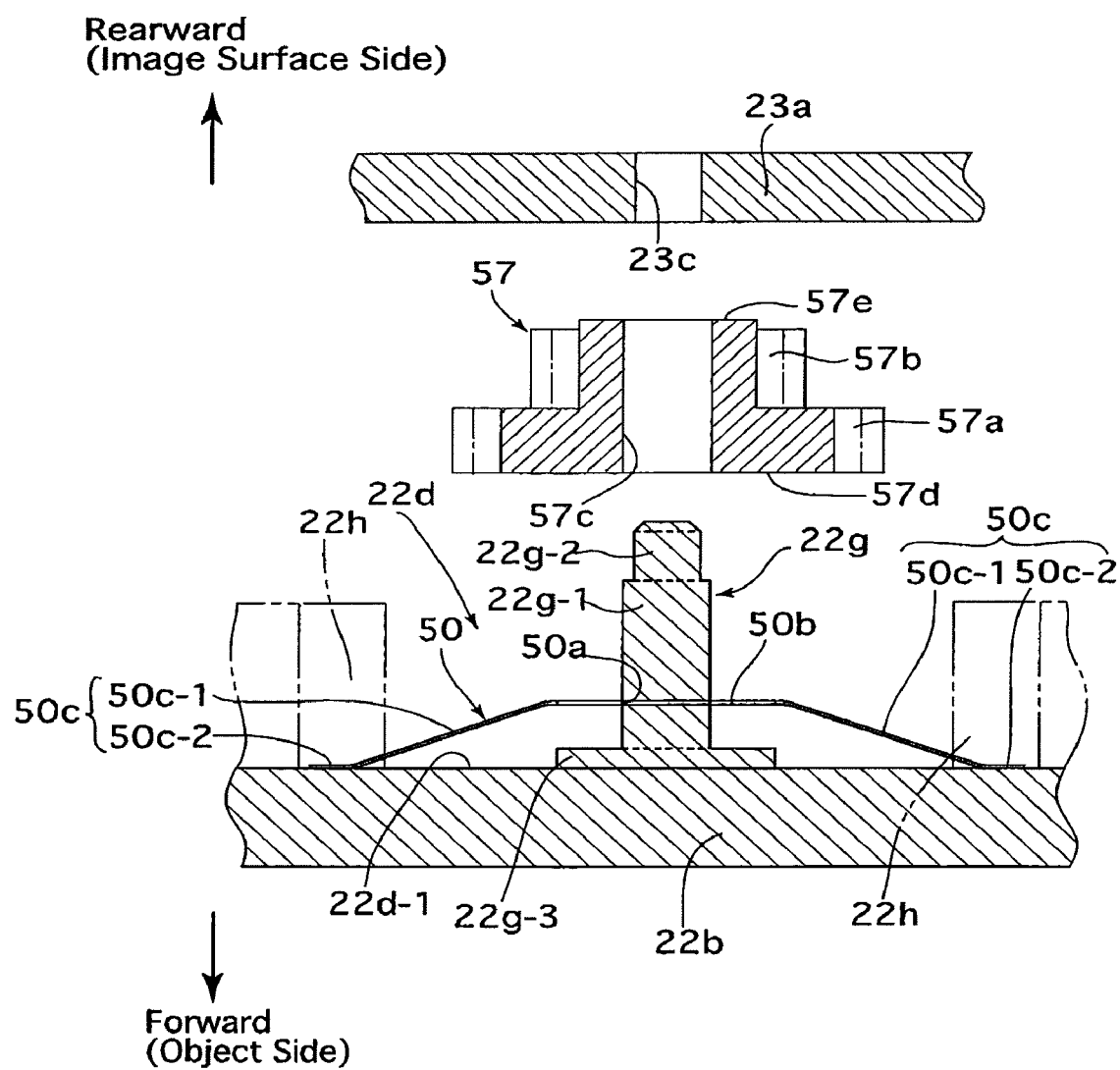
FIG. 13 is an exploded cross sectional view of a portion of the zoom lens barrel taken along the axis of a gear-shaft projection of the housing, showing the positional relationship among the drive mechanism mounting portion of the housing, a gear-train retaining portion of an image pickup device holder, the intermediate gear and the intermediate-gear biasing spring.
Figure 14:
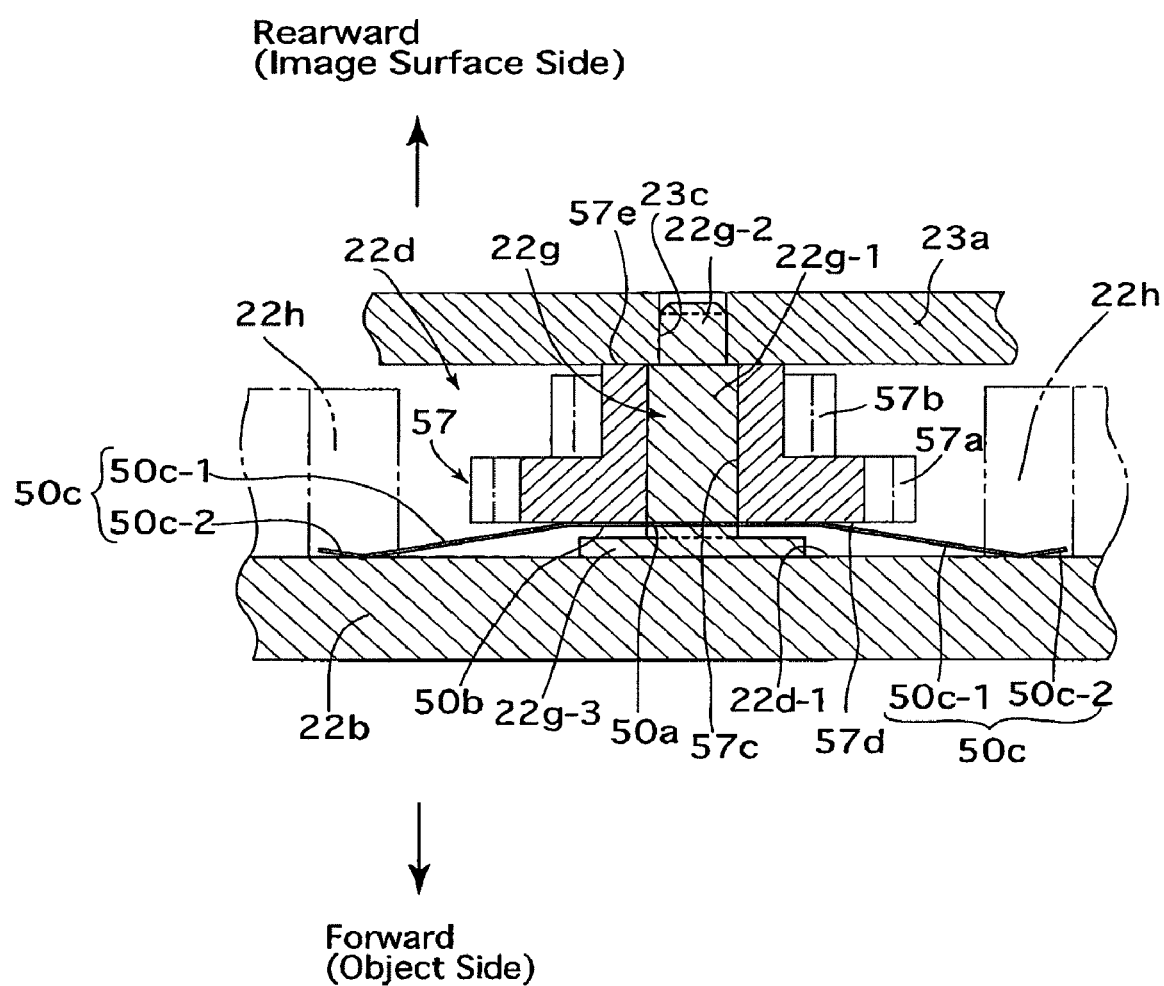
FIG. 14 is a cross sectional view of the portion of the zoom lens barrel shown in FIG. 13, showing the positional relationship among the drive mechanism mounting portion, the gear-train retaining portion, the intermediate gear and the intermediate-gear biasing spring in a state where the installation of the intermediate gear is complete.

As shown in FIGS. 11 and 12, the three resilient support legs 50c of the intermediate-gear biasing spring 50 are substantially mutually identical in length and shape and arranged at substantially equi-angular intervals in a circumferential direction about the central seating portion 50b, as viewed in a direction along the axis of the gear-shaft projection 22g (in a direction of extension of the axis of the gear-shaft projection 22g). Additionally, as shown in FIGS. 13 and 14, the central seating portion 50b lies in a plane orthogonal to the axis of the gear-shaft projection 22g, and each of the three resilient support legs 50c is provided with an inclined portion 50c-1 and a contacting end portion 50c-2. The inclined portion 50c-1 is formed to approach the bottom surface 22d-1 of the intermediate-gear holding recess 22d gradually in a direction away from the central seating portion 50b, and the contacting end portion 50c-2 is brought into contact with the bottom surface 22d-1 of the intermediate-gear housing recess 22d.

As shown in FIG. 12, the drive mechanism installation portion 22b of the housing 22 is provided with three anti-rotation recesses (anti-rotation portions) 22h, each of which is formed to face an inner wall surface of the intermediate-gear housing recess 22d. The three anti-rotation recesses 22h are formed at substantially equi-angular intervals in a circumferential direction at positions so as not to overlap either the pinion housing hole 22c or the screw-shaft housing space 22e, which is adjacent to the intermediate-gear housing recess 22d. The contacting end portions 50c-2 of the three resilient support legs 50c of the intermediate-gear biasing spring 50 are engaged in the three anti-rotation recesses 22h, respectively, to prevent the intermediate-gear biasing spring 50 from rotating. More specifically, a positioning boss 22i is formed on the drive mechanism installation portion 22b to project therefrom to be engaged in a positioning hole 23e (see FIG. 5) formed on the gear-train retaining portion 23a, and the three anti-rotation recesses 22h are formed about the gear-shaft projection 22g at three different positions, i.e., a first position between the positioning boss 22i and the pinion housing hole 22c, a second position between the positioning boss 22i and the screw-shaft holding space 22e, and a third position between the pinion housing hole 22c and the screw-shaft holding space 22e.

As shown in FIGS. 12 through 14, before the installation of the intermediate gear 57, the intermediate-gear biasing spring 50 is installed in the intermediate-gear housing recess 22d with the gear-shaft projection 22g being inserted into the central hole 50a and with the three resilient support legs 50c being engaged in the three anti-rotation recesses 22h. The three resilient support legs 50c are arranged at equi-angular intervals (intervals of 120 degrees) about the gear-shaft projection 22g, while the three anti-rotation recesses 22h are also arranged at equi-angular intervals (intervals of 120 degrees) about the gear-shaft projection 22g. Additionally, the three resilient support legs 50c are mutually identical in length and shape. Accordingly, each resilient support leg 50c can be engaged in any of the three anti-rotation recesses 22h. Namely, the intermediate-gear biasing spring 50 can be installed in the intermediate-gear housing recess 22d at any of the three angular positions that exist at three positions in the circumferential direction.

In a free state of the intermediate-gear biasing spring 50 as shown in FIG. 13, the rising angle of the inclined portion 50c-1 of each resilient support leg 50c relative to the bottom surface 22d-1 of the intermediate-gear holding recess 22d is large while the central seating portion 50b is spaced apart from the bottom surface 22d-1 of the intermediate-gear holding recess 22d by a large amount. In this state, the contacting end portions 50c-2 of the three resilient support legs 50c are substantially parallel to the central seating portion 50b. Subsequently, upon the intermediate gear 57 being fitted at the shaft hole 57c on the gear-shaft projection 22g with the large-diameter gear portion 57a facing the intermediate-gear biasing spring 50, the axially-orthogonal end surface 57d comes in contact with the central seating portion 50b and is supported thereby. In this state, the axially-orthogonal end surface 57e of the intermediate gear 57 is positioned behind (above with respect to FIG. 13) the boundary between the large-diameter intermediate portion 22g-1 and the small-diameter end portion 22g-2 of the gear-shaft projection 22g. Subsequently, when the image pickup device holder 23 is fixed to the housing 22, the small-diameter end portion 22g-2 of the gear-shaft projection 22g is inserted into the shaft fixing hole 23c, the front surface of the gear-train retaining portion 23a presses the axially-orthogonal end surface 57e of the intermediate gear 57, and the intermediate gear 57 is pressed into the intermediate-gear housing recess 22d while each of the three resilient support legs 50c is resiliently deformed as shown in FIG. 14.

The large-diameter intermediate portion 22g-1 of the gear-shaft projection 22g is greater in axial length than the shaft hole 57c of the intermediate gear 57 in the same direction. In a state where the intermediate gear 57 is pressed into the intermediate-gear housing recess 22d as shown in FIG. 14, the axially-orthogonal end surface 57d on the large-diameter gear portion 57a side is not in contact with either the base portion 22g-3 of the gear-shaft projection 22g or the bottom surface 22d-1 of the intermediate-gear holding recess 22d so as to allow the intermediate gear 57 to move slightly in the axial direction thereof. In addition, due to the resilient force of each resilient support leg 50c, which resiliently returns the resilient support leg 50c to its original shape (non-deformed shape), the position of the intermediate gear 57 in the axial direction thereof becomes stable because the intermediate gear 57 is biased in a direction to cause axially-orthogonal end surface 57e on the small-diameter gear portion 57b side press against the gear-train retaining portion 23a. Namely, the biasing force of the intermediate-gear biasing spring 50 prevents the intermediate gear 57 from rattling and fluttering, and can suppress noise caused when the AF motor 160 is driven.

In the intermediate-gear biasing spring 50, rotating members and rotation shafts such as the pinion 160b and the rotary output shaft 160a of the AF motor 160, and the driven gear 56 and the screw shaft 58 are positioned in between the plurality of resilient support legs 50c that extend radially from the central seating portion 50b. Accordingly, the intermediate-gear biasing spring 50 does not interfere with such rotating members, which makes it possible to install the intermediate-gear biasing spring 50 in a space-saving manner. More specifically, as viewed from the front along the axial direction of the gear-shaft projection 22g as shown in FIG. 11, a part of the pinion 160b, which is a gear on the motor side in the gear mechanism, and the rotary output shaft 160a, which is the center of rotation of the pinion 160b, are positioned within a inter-leg space which is surrounded by the two resilient support legs 50c-A and 50c-B and a circumscribing circle R of the three resilient support legs 50c-A, 50c-B and 50c-C (shown by a two-dot chain line in FIG. 11) about the gear-shaft projection 22g. Likewise, apart of the driven gear 56, which is a gear on the driven side of the gear mechanism, and a part of the screw shaft 58 are positioned within a inter-leg space which is surrounded by the two resilient support legs 50c-B and 50c-C and the circumscribing circle R.

For instance, unlike the above described embodiment, if it is assumed that a circular spring washer, the external shape of which corresponds to the circumscribing circle R shown in FIG. 11, is used as a biasing member instead of the intermediate-gear biasing spring 50, the pinion 160b and the driven gear 56 would need to be arranged outside of the circumscribing circle R (at positions distant from the gear-shaft projection 22g) to be prevented from interfering with such a circular spring washer, which makes it impossible to achieve a compact gear arrangement like that in the above described embodiment. If the spring washer is replaced by another one having a small diameter to achieve a compact gear arrangement, strict precision control for reducing dimension errors of the spring washer is required, which causes an increase in the production cost since the variation of load of a spring member per unit of displacement magnitude becomes greater as the size of the spring member becomes smaller as noted above.

In contrast, in the intermediate-gear biasing spring 50 adopted in the present embodiment, the lengths of the three resilient support legs 50c and the biasing force thereof can be freely determined without the occurrence of interference with the pinion 160b, the driven gear 56 or the like. Accordingly, even in the case of making the three resilient support legs 50c long to suppress the variation of load on each product, the positions of the pinion 160b and the driven gear 56 do not need to be changed, and the stability of the biasing force relative to the intermediate gear 57 can be achieved while the compact structure is maintained. In addition, making the three resilient support legs 50c long facilitates the accuracy control of the intermediate-gear biasing spring 50, the varia-tion of load of which has been suppressed, which makes it possible to provide the biasing spring at a low cost.

In addition, since the intermediate-gear biasing spring 50 is prevented from rotating by engagement with the three anti-rotation recesses 22h of the housing 22, the intermediate-gear biasing spring 50 is not rotated by rotation of the intermediate gear 57 and can be securely prevented from interfering with the peripheral elements such as the pinion 160b and the driven gear 56.

Although the present invention has been discussed based on the present embodiment described with reference to the attached drawings, the present invention is not limited to this particular embodiment. For instance, from the view point of the compatibility between support stability and space-utilization efficiency, it is desirable that the number of the resilient support legs 50c of the intermediate-gear biasing spring 50 be three as with the intermediate-gear biasing spring 50 of the above described embodiment of the zoom leas barrel. However, the number of the resilient support legs 50c of the intermediate-gear biasing spring 50 can be two or more than three.

Additionally, the degree of freedom in installation of the intermediate-gear biasing spring 50 can be increased by forming the three resilient support legs 50c so as to have the same length and shape and arranging the three resilient support legs 50c at equi-angular intervals; however, it is possible to alter these conditions of the resilient support legs 50c. For instance, in the case where the lengths of adjacent resilient support legs are different, the aforementioned effect that is obtained by the above described compact design can be obtained by installing at least a part of the gears adjacent to the intermediate gear in the inter-leg space radially inside the short resilient support leg or legs (i.e., inside of the circumscribing circle of the short resilient support leg or legs about the gear shaft of the intermediate gear).

Additionally, although the central seating portion (gear contacting portion) 50b of the intermediate-gear biasing spring (spring member) 50 in the above described embodiment of the zoom lens barrel is shaped as a circular ring having the circular hole 50a, into which the large-diameter intermediate portion 22g-1 of the gear-shaft projection 22g is inserted, the shape of the gear contacting portion of the spring member is not limited to this particular shape. For instance, it is possible that the gear contacting portion of the spring member be in the shape of a letter C.

Additionally, in the present embodiment of the zoom lens barrel, the gear-shaft projection 22g is formed on the drive mechanism installation portion 22b of the housing 22 to project therefrom, the end of the gear-shaft projection 22g is inserted into the shaft fixing hole 23c that is formed on the gear-train retaining portion 23a of the image pickup device holder 23, and the drive mechanism installation portion 22b and the gear-train retaining portion 23a serve as gear-shaft support members which support both ends of the gear-shaft projection 22g, respectively. In the present invention, it is possible to apply any of the modified embodiments shown in FIGS. 15 and 16.

Figure 15:
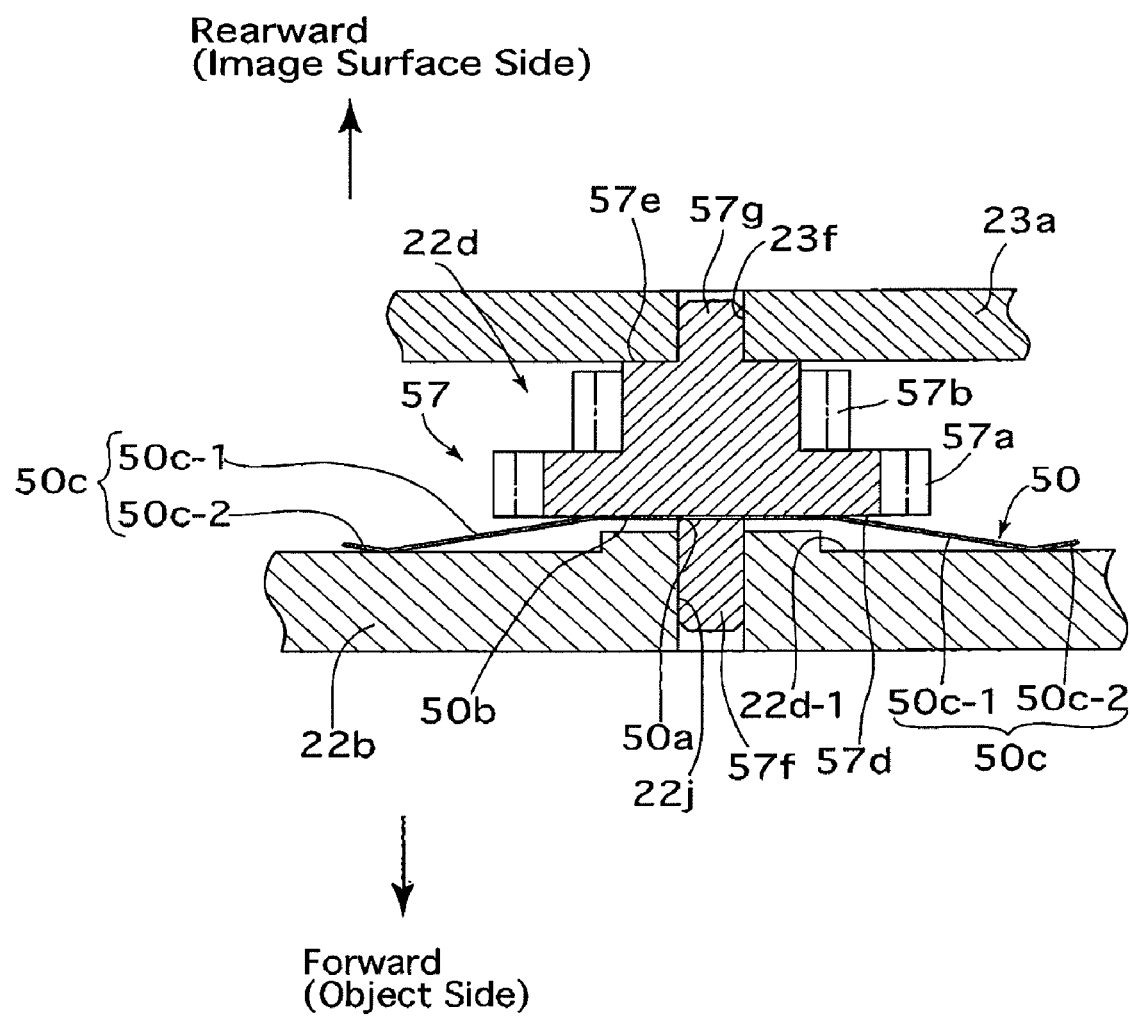
FIG. 15 is a cross sectional view of a modified embodiment of the embodiment shown in FIG. 14.

FIG. 15 shows a modified embodiment in which two shaft holes 22j and 23f are provided in the drive mechanism installation portion 22b and in the gear-train retaining portion 23a, respectively, and two gear-shaft projections 57f and 57g supported by these shaft holes 22j and 23f are integrally formed with the intermediate gear 57. The remaining fundamental structure of this modified embodiment is the same as that of the embodiment shown in FIG. 14.

Figure 16:
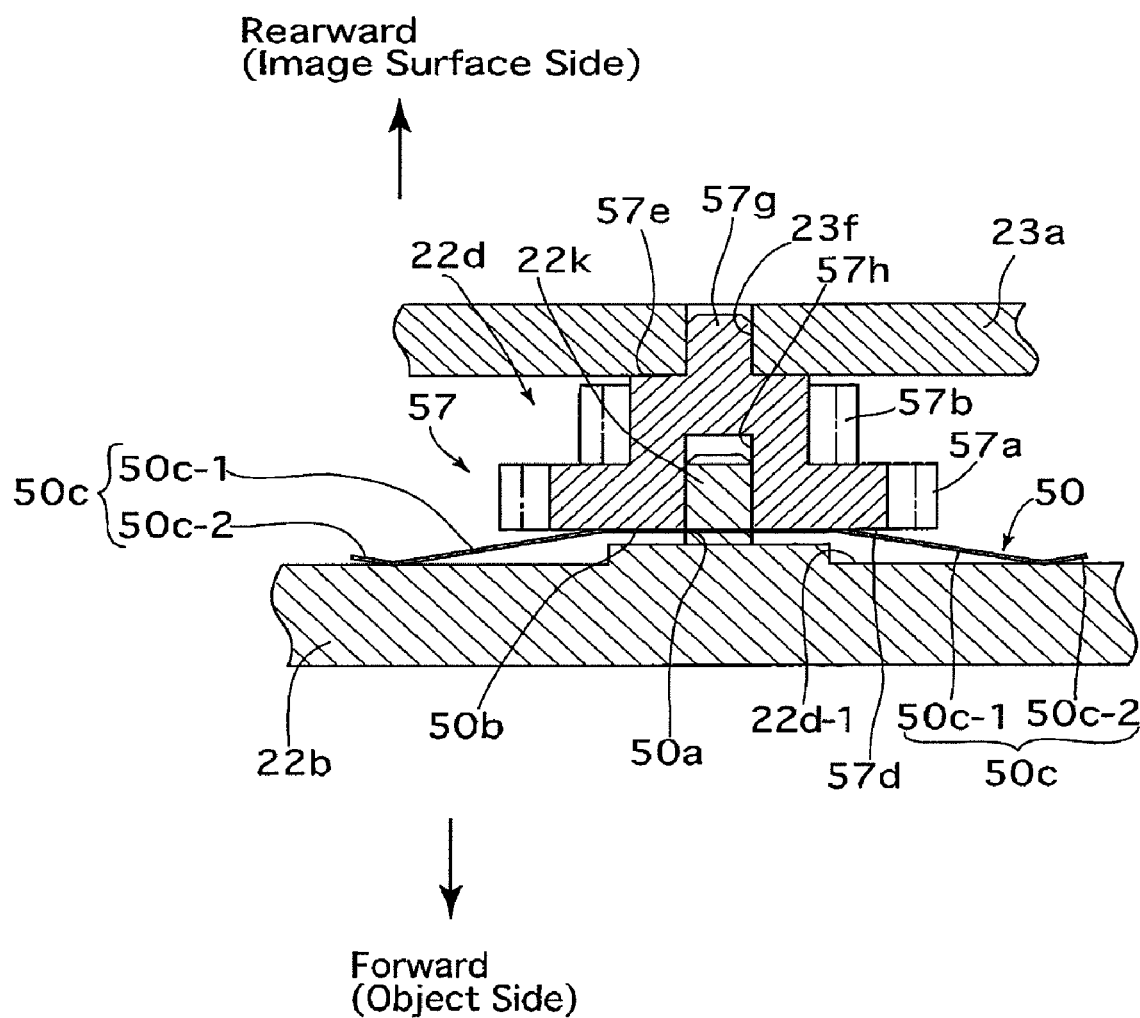
FIG. 16 is a cross sectional view of another modified embodiment of the embodiment shown in FIG. 14.

FIG. 16 shows another modified embodiment in which a gear-shaft projection 22k and a shaft hole 57h are provided on the drive mechanism installation portion 22*b* and in the intermediate gear 57, respectively, instead of the gear-shaft projection 57*f* and the shaft hole 22*j* of the embodiment of FIG. 15. The remaining fundamental structure of this modified embodiment is the same as that of the modified embodiment shown in FIG. 15.

Alternatively, the gear-shaft projection(s) can be formed as a separate gear shaft which is separate from the drive mechanism installation portion 22*b*, the gear-train retaining portion 23*a*, and the intermediate gear 57.

In other words, in the present invention, the gear-shaft support members and the intermediate gear are not limited to any specific embodiment of the zoom lens barrel. Hence, it is possible for the gear-shaft support members to be configured by a combination of a member (the drive mechanism installation portion 22*b*) with which the gear shaft projection (22*g*) is formed integral and a retainer member (the gear-train retaining portion 23*a*), like that of the first embodiment of the present invention; or that the gear-shaft support members be configured by two shaft-hole forming members which have shaft holes (22*j* and 23*f*) for supporting each end of corresponding gear-shaft projections (57*f* and 57*g*), respectively, or each corresponding end of a separate gear shaft; or that the gear-shaft support members be configured by a retainer member which has a shaft hole (23*f*) and a member which has a shaft projection (22*k*), respectively, for supporting an end of a gear-shaft projection (57*g*) and a shaft hole (57*h*), respectively.

Additionally, although the intermediate-gear biasing spring 50 is installed between the drive mechanism installation portion 22*b* of the housing 22 and the intermediate gear 57 so that the intermediate gear 57 is biased in a direction to approach the gear-train retaining portion 23*a* in the above described embodiment of the zoom lens barrel, the arrangement of the intermediate-gear biasing spring 50 and the biasing direction can be reversed, i.e., it is possible for the intermediate-gear biasing spring 50 to be installed between the gear-train retaining portion 23*a* and the intermediate gear 57 so that the intermediate gear 57 is biased in a direction to approach the drive mechanism installation portion 22*b*.

Additionally, the present invention is suitable especially for a type of gear mechanism which is driven intermittently at a high speed like the drive mechanism of the above described embodiment of the zoom lens barrel for driving the AF lens group. However, the present invention is applicable to any other type of drive mechanism.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A gear support mechanism for supporting two gears and an intermediate gear which meshes with said two gears to transfer rotation of one of said two gears to the other, said gear support mechanism comprising:
   at least one gear-shaft support member which supports a gear shaft of said intermediate gear; and
   a spring member installed between said gear-shaft support member and said intermediate gear,
   wherein said spring member includes a gear contacting portion which is in contact with said intermediate gear, and a plurality of resilient support legs which are resiliently deformable, extending radially from said gear contacting portion and are in contact with said gear-shaft support member, said spring member biasing said intermediate gear in a direction of an axis of said gear shaft by resiliently deforming said plurality of resilient support legs, and
   wherein at least a part of each said two gears is positioned in an inter-leg space between adjacent resilient support legs of said plurality of resilient support legs as viewed in a direction along a central axis of rotation of said intermediate gear.

2. The gear support structure according to claim 1, wherein said plurality of resilient support legs are substantially the same in length from said gear contacting portion and arranged at substantially equi-angular intervals.

3. The gear support structure according to claim 1, wherein said gear-shaft support member comprises at least one anti-rotation portion which engages with said plurality of resilient support legs to prevent said spring member from rotating.

4. The gear support structure according to claim 3, wherein said gear-shaft support member comprises a cylindrical recessed portion for housing said intermediate gear, and
   wherein said anti-rotation portion includes a recessed portion formed on an inner wall of said cylindrical recessed portion.

5. The gear support structure according to claim 1, wherein said gear-shaft support member comprises:
   a gear-shaft forming portion from which said gear shaft of said intermediate gear projects; and
   a retaining member which is fixed to said gear-shaft forming portion, supports an end of said gear shaft and prevents said intermediate gear from coming off said gear shaft, and
   wherein said spring member is installed between said intermediate gear and one of said gear-shaft forming portion and said retaining member.

6. The gear support structure according to claim 1, wherein said gear contacting portion of said spring member is shaped into a ring having an opening into which said gear shaft is inserted.

7. The gear support structure according to claim 1, wherein said gear-shaft support member comprises two parallel plates which support both ends of said gear shaft, respectively.

8. The gear support structure according to claim 1, wherein said intermediate gear comprises a double gear including a small-diameter gear and a large-diameter gear which mesh with said two gears, respectively.

9. The gear support structure according to claim 1, wherein said plurality of resilient support legs extend from said gear contacting portion in radial directions obliquely away from said intermediate gear.

10. The gear support structure according to claim 1, wherein a free end of each said plurality of resilient support legs comprises a contacting end portion which lies in a plane substantially parallel to said gear contacting portion when said spring member is in a free state.

11. The gear support structure according to claim 1, wherein said two gears and said intermediate gear are elements of a gear mechanism for driving an autofocus lens group of an imaging device.

12. The gear support structure according to claim 1, wherein said gear shaft is integrally formed with said gear-shaft support member, and
   wherein a shaft hole, which rotatably supports said gear shaft, is formed in said intermediate gear.

13. The gear support structure according to claim 1, wherein said gear shaft is integrally formed with said intermediate gear, and
   wherein a shaft hole, which rotatably supports said gear shaft, is formed in said gear-shaft support member.

14. A gear support mechanism for supporting a gear train including a driving gear, a driven gear and an intermediate gear positioned between said driving gear and a driven gear to transfer rotational torque from said driving gear to said driven gear via said intermediate gear, said gear support mechanism comprising:
- two support members which hold said intermediate gear therebetween and support both ends of a gear shaft of said intermediate gear, respectively; and
- a spring member installed between one of said two support members and said intermediate gear,
- wherein said spring member includes a gear contacting portion which is in contact with said intermediate gear, and at least two resilient support legs which extend radially outwards from said gear contacting portion, radially outer ends of said two resilient support legs lying in a plane different from a plane in which said gear contacting portion lies and being in contact with said one of said two support members, and
- wherein at least a part of said driving gear and at least a part of said driven gear are positioned inside of a circumscribing circle of said two resilient support legs about an axis of said gear shaft as viewed in a direction along a central axis of rotation of said intermediate gear.

* * * * *